United States Patent [19]

Debaux et al.

[11] Patent Number: 5,277,763
[45] Date of Patent: Jan. 11, 1994

[54] BASIC COMPOSITION FOR THE MANUFACTURE OF A FLEXIBLE AND POROUS PRODUCT IN SHEET FORM CONTAINING ELASTOMER POWDER, PRODUCT IN SHEET FORM AND ITS MANUFACTURING PROCESS

[75] Inventors: Bernard Debaux, Saint-Maur; Pierre Fredenucci, Charavines, both of France

[73] Assignee: Arjo Wiggins S.A., Paris, France

[21] Appl. No.: 928,528

[22] Filed: Aug. 12, 1992

Related U.S. Application Data

[63] Continuation of Ser. No. 671,697, filed as PCT/FR89/00499, on Sep. 28, 1989, abandoned.

[30] Foreign Application Priority Data

Sep. 30, 1988 [FR] France ................ 88 12854
Oct. 26, 1988 [FR] France ................ 88 13994

[51] Int. Cl.$^5$ .............................. D21H 17/34
[52] U.S. Cl. ......................... 162/145; 162/152; 162/156; 162/168.1; 162/169; 162/183

[58] Field of Search ............... 162/145, 168.1, 169, 162/183, 152, 156

[56] References Cited

U.S. PATENT DOCUMENTS

| | | | |
|---|---|---|---|
| 3,184,373 | 5/1965 | Arledter | 162/168.1 |
| 4,002,527 | 1/1977 | Piersol | 162/169 |
| 4,097,644 | 6/1978 | Evensen et al. | 162/169 |
| 4,426,470 | 1/1984 | Wessling et al. | 162/169 |
| 4,510,019 | 4/1985 | Bartelloni | 162/169 |
| 4,645,565 | 2/1987 | Vallee et al. | 162/169 |

OTHER PUBLICATIONS

Bost, "Matiere Plastiques-Chimie-Applications," Technique & Documentation, Apr. 1974, pp. 188-189.

*Primary Examiner*—Peter Chin
*Attorney, Agent, or Firm*—Bacon & Thomas

[57] ABSTRACT

The present invention relates to a basic composition for the manufacture of a product in sheet form, obtained in particular by the wet method, of the type comprising a mixture of a polymer powder of given granulometry and of fibers, characterized in that it comprises a preferably intimate mixture of:

a) at least one elastomer powder, of granulometry less than about 500 μm, called elastomer fine dust, and
b) fibers of length less than about 10 mm, selected from the group composed of natural fibers, inorganic fibers and mixtures thereof.

18 Claims, No Drawings

BASIC COMPOSITION FOR THE MANUFACTURE OF A FLEXIBLE AND POROUS PRODUCT IN SHEET FORM CONTAINING ELASTOMER POWDER, PRODUCT IN SHEET FORM AND ITS MANUFACTURING PROCESS

This application is a continuation of application Ser. No. 07/671,697, filed as PCT/FR89/00499 on Sep. 28, 1989, now abandoned.

The present invention relates to a porous and flexible product in sheet form, containing elastomer powder. The invention also relates to its composition and to its manufacturing process.

More particularly, the invention relates to a porous and flexible product in sheet form which comprises at least one elastomer in powder form, organic and/or inorganic fibers, and optionally other additives. The invention also relates to the process for manufacturing said sheet product by the wet method, and in particular by the papermaking method.

The products in sheet form described in Applicant's patent EP-6 390 give materials with insufficient porosity and flexibility to meet certain demands of the market of base materials for floor coverings in thick polyvinyl chloride.

Accordingly, the Applicant has confirmed the impossibility of improving satisfactorily the flexibility of these products by increasing the proportion of latex incorporated in bulk, or by addition of latex by an impregnation technique.

Moreover, such additions create known problems of bubbling and blistering of the layers of plasticols during transformation due to a lack of porosity in the base material.

Indeed, elastic products in sheet form are already known, namely products with a high level of breaking elongation. The manufacture of such products requires the introduction of a large quantity of elastomer in solution, dispersion or emulsion form. These elastomers in such forms permit the formation of a continuous film after elimination by drying of the dissolving, emulsifying or suspending medium. This film-forming property of the elastomer confers to the material a high elasticity, a good internal cohesion, but a very poor porosity.

Various techniques are used, singly or in combination, for introducing these elastomers, for example:

flocculation of latex of elastomers in bulk. This technique does not allow the introduction of more than 30% of elastomer, on a papermaking machine, with respect to the rest of the components. Indeed, elastomers are soft products, very sticky, causing clogging by deposition in the circuits and on the web of the papermaking machine. Moreover, said flocculation technique has the disadvantage of causing, in the presence of organic and/or inorganic fibers and independently of the flocculation of the latex necessary to its retention, the flocculation of the fibers, which strongly affects the homogeneity of the material, deposition by spraying on the dry or wet sheet. This deposition demands extra equipment and does not permit a homogeneous introduction of high quantities of elastomers in the thiskness of the material, deposition by impregnation of the dry or wet sheet. This deposition is limited by the sheet absorbing power and requires very expensive extra equipment (impregnating machine). This last technique is the most commonly used. Among known materials are the celloderm materials which are constituted by a cellulose sheet, in which one or more latex of elastomers are incorporated by impregnation at wet end section of the papermaking machine. This manufacturing technique leads to an important clogging of the cellulosic sheet.

In all cases, such additional treatments affect rather considerably the running speed of the papermaking machine and create extra consumption of energy for eliminating the dissolving, dispersing or emulsifying medium.

Moreover, and as already indicated, the film-forming property of the elastomer introduced by said techniques, leads to products which are elastic but low in porosity, all the more so as high proportions of elastomers are incorporated.

French Patent Application FR-2-514 015 relates to compositions comprising fibrillae of polyolefins with which flexible heat-strengthened sheets can be obtained economically, showing a good ability to deep heat-shaping. Said compositions contain particles of a rubbery material. The sheets which show very poor internal cohesion, are strengthened by heating up to a temperature higher than the softening point of the polyolefin fibers.

It is therefore the object of the present invention to solve the technical problem consisting in supplying a product in sheet form which has the following characteristics:

a homogeneous structure,
a high elasticity,
a high porosity,
a good internal cohesion.

Another object of the invention is to obtain such a product by a wet method process. "Wet method process" is understood to mean a process for forming a sheet on a screen by drainage of a suspension, then drying of the sheet.

Yet a further object of the invention is to solve the abovecited technical problem by providing a solution enabling such a sheet product to be manufactured with the minimum of steps.

The invention has solved the aforesaid technical problems simultaneously, for the first time, in a satisfactory manner applicable on an industrial scale.

Thus, according to a first aspect, the invention provides a basic composition for manufacturing a product in sheet form, particularly obtained by the wet method, of the type comprising a mixture of a powder of given granulometry and of fibers, characterized in that it comprises a preferably intimate mixture of:

a) at least one elastomer powder of granulometry less than about 500 μm, called elastomer fine dust, and b) fibers of length less than about 10 mm, selected from the group composed of natural fibers, inorganic fiber and mixtures thereof.

According to a particular embodiment, this composition is characterized in that it comprises:

between 20 and 80% by weight of at least one elastomer in powder form, of granulometry less than at least 500 μm, between 10 and 70% by weight of fibers, optionally between 0 and 20% of at least one binding agent, optionally between 0.1 and 5% by weight of at least one flocculating agent and/or of at least one retention agent, optionally between 0 and 40% of at least one inorganic and/or organic filler, said filler possibly partly replacing said elastomer, the total of the above components being 100%, the contents being given in dry weight.

Said composition may optionally comprise additives usually used in papermaking and wellknown to anyone skilled in the art.

According to a second aspect, the invention provides a product in sheet form, particularly obtained by the wet method and more particularly obtained from the aforesaid basic composition.

Said sheet product is characterized in that it comprises a preferably intimate mixture of:

a) at least one elastomer powder of granulometry less than about 500 μm, called elastomer fine dust, and b) fibers of length less than about 10 mm, selected from the group composed of natural fibers, inorganic fibers and mixtures thereof.

According to one particularly advantageous embodiment, said sheet product is characterized in that it comprises:

between 20 and 80% by weight of at least one elastomer in powder form, of granulometry less than at least 500 μm, between 10 and 70% by weight of fibers, optionally between 0 and 20% by weight of at least one binding agent, optionally between 0.1 and 5% by weight of at least one flocculating agent and/or at least one retention agent, optionally between 0 and 40% by weight of at least one inorganic and organic filler, said filler optionally replacing partly said elastomer, the total of the above components being 100% and the contents being given by dry weight. This composition may optionally contain additives usually used in papermaking and wellknown to anyone skilled in the art.

According to another variant embodiment of the invention, said fibers are preferably refined cellulose fibers.

According to another variant embodiment of the invention, said fibers comprise a mixture of glassfibers and of cellulose fibers.

According to a particularly advantageous embodiment, said elastomer powder called elastomer fine dust, comprises a vulcanized recovery rubber.

According to another preferred embodiment of the invention, said basic composition or said sheet product is characterized in that it comprises:

about 70 to 75% by weight of a mixture of vulcanized rubber powder with, optionally an inorganic and/or organic filler, about 15 to 20% by weight of preferably refined cellulose fibers and/or inorganic fibers, about 8 to 12% by weight of at least one latex type binding agent, about 0.3 to 0.5% by weight of at least one cationic flocculating agent, the total of the aforesaid components being 100%, the contents being given by dry weight. This composition may optionally comprise additives usually used in papermaking and wellknown to anyone skilled in the art.

Such additives may be constituted for example by water—repelling agents, lubricating agents, anti-foaming agents. The water-repelling agent can for example be a dimeric alkylketene, or a modified or non-modified resin.

According to a third aspect, the present invention further provides a process for the manufacture of a product in sheet form according to the invention, characterized in that said process consists in:

preparing an aqueous suspension of a mixture containing:

20 to 80% by weight of an elastomer in powder form, of mean granulometry less than 500 μm or of a mixture of said elastomer with at least one filler, 10 to 70% by weight of fibers of length less than 10 mm, selected from the group composed of natural fibers, inorganic fibers and mixture thereof, optionally adding to the suspension a first quantity of a flocculating agent, optionally adding between 0 and 20% by weight of a binding agent to the suspension containing the flocculating agent, optionally adding additives, then optionally adding a second quantity of a flocculating agent and/or of a retention agent, depositing the resulting aqueous suspension on a screen, draining the suspension deposited on the screen in order to form a wet sheet, and drying the sheet in order to obtain the product in sheet form.

According to one embodiment of the process according to the invention, it may be advantageous to carry out complementary treatments on the sheet product obtained as indicated, in order to give it special properties. Such treatments may be produced by all the means known in papermaking, such as the size-press or the coaters.

The Applicant has unexpectedly discovered that the invention such as described hereinabove makes it possible to obtain for the first time a product in sheet form which has, simultaneously, the required physical characteristics. It is thus possible to manufacture a porous material which retains important properties of elasticity by introducing an elastomer in powder form and without having to form an elastic film.

The Applicant has further discovered that, contrary to what anyone skilled in the art might fear, the introduction of such elastomers in powder form does not interfere with the internal cohesion of the material, despite a strong increase of the porosity and of the bulk thereof.

According to the invention, "elastomer in powder form" or "elastomer fine dust" is understood to mean an elastomer having a granulometry less than about 500 μm, and preferably ranging between about 40 and 300 μm.

As elastomer product according to the invention, it is possible to use any elastomer capable of being in powder form such as for example vulcanized or non-vulcanized natural rubber, synthetic rubber such as BUNA (butadiene polymer), BUNA S or SBR (styrene-butadiene copolymer), acrylic butadiene-nitrile copolymers, polychloroprenes (2-chloro butadiene polymers, chlorosulfonated polyethylene, polyisobutylenes, ethylene-propylene, isobutylene-butadiene, isoprene copolymers, polyacrylic esters, fluorinated derivatives of rubber, silicon rubbers, polyurethane elastomers. For economical reasons, preferred elastomers are powders from vulcanized or non-vulcanized rubber wastes. Said powders are available in large quantity and at a considerably lower price than the elastomers in latex form used according to the prior techniques.

The fibers usable for manufacturing the product according to the invention are fibers having a length less than 10 mm. It is possible to use organic or inorganic fibers or mixtures thereof. Preferably, cellulosic fibers are used. Outside of cellulosic fibers, suitable fibers are for example as follows:

glassfibers (preferably 5 to 10 μm in diameter and 3 to 6 mm long), calcium sulfate or acicular gypsum fibers (preferably between 0.5 and 3 mm long), Rock wool (0.1 to 0.3 mm long).

Suitable binding agents according to the invention are:

native amylum, native starch, particularly native cornstarch, phosphoric ester of starch, carboxymethylated starch, oxidized starch, enzymed starch (enzyme: alpha-amylase, for obtaining a distribution of the glucose units variable between 50 and 3000) (for the straight-chain polymer amylose), hydroxymethylated starch technical carboxymethylcellulose (5 to 30% sodium chloride-degree of substitution: 0.7 to 0.8), polyvinyl alcohol polymer containing 87 to 90 parts by weight of ethyl acrylate structure, 1 to 8 parts by weight of acrylonitrile structure, 1 to 6 parts by weight of N-methylolacrylamide and 1 to 6 parts by weight of acrylic acid structure, aqueous dispersion at 40-55%, polymer containing 60 to 75 parts by weight of ethyl acrylate structure, 35 to 40 parts by weight of acrylonitrile structure and 1 to 7 parts by weight of methacrylic acid structure, aqueous dispersion at 40-55%, polymer containing 38 to 50 parts by weight of styrene structure, 47 to 59 parts by weight of butadiene structure and 1 to 6 parts by weight of methylacrylamide structure, aqueous dispersion at 40-55%, Polymer containing 53 to 65 parts by weight of styrene structure, 32 to 44 parts by weight of butadiene structure and 1 to 6 parts by weight of methylacrylamide structure, aqueous dispersion at 40-55%, ethylene terpolymer/vinyl acetate/vinyl chloride, aqueous dispersion at 40-55%.

Suitable flocculating agents and retention agents are for example, as follows:

aluminium sulfate, aluminium polychloride (aluminium hydroxychloride), sodium and calcium aluminate, mixture of polyacrylic acid and polyacrylamide in solution at 5-30% (weight/volume), polyethyleneimine in 2-50% solution (weight/volume), Copolymer of acrylamide and of beta-methacryloxyethyltrimethylammonium methylsulfate, polyamine-epichlorhydrin and diamine-propylmethylamine resin in 2-50% solution, polyamine-epichlorhydrin resin produced from epichlorhydrin, adipic acid, caprolactame, diethylenetriamine and/or ethylene-diamine, in 2-50% solution, polyamide-polyamine-epichlorhydrin resin produced from epichlorhydrin, dimethyl ester, adipic acid and diethyltriamine, in 2-50% solution, polyamide-epichlorhydrine resin produced from epichlorhydrine, diethylenetriamine, adipic acid and ethyleneimine, polyamide-epichlorhydrin produced from adipic acid, diethylene-triamine and from a mixture or epichlorhydrin and dimethylamine in solution at 2-50%, cationic polyamide-polyamine resin produced from triethylene triamine, Condensation products of aromatic sulfonic acids with formaldehyde, aluminium acetate, aluminium formiate, mixture of aluminium acetate, sulfate and formiate, aluminium chloride (AlCl$_3$), cationic starch.

Inorganic fillers may be optionally added, example of suitable fillers are as follows:

talc: complex magnesium silicate—particles of 1 to 50 μm, preferably 2 to 50 μm—specific weight 2.7 to 2.8, kaolin: complex hydrated aluminium silicate—particles of 1 to 50 μm, preferably 2 to 50 μm—specific weight 2.58, natural calcium carbonate: particles of 1.5 to 20 μm, preferably 2 to 20 μm—specific weight 2.7, precipitated calcium carbonate: particles of 1.5 to 20 μm, preferably 2 to 20 μm—specific weight 2.7, natural baryum sulfate: particles of 2 to 50 μm—specific weight about 4.4–4.5, precipitated baryum sulfate: particles of 2 to 20 μm—specific weight about 4.35, silica of diatoms: particles of 2 to 50 μm—specific weight about 2 to 2.3, satin white: hydrated calcium sulfoaluminate, natural calcium sulfate: particles of 2 to 50 μm—specific weight about 2.32-2.96, hydrated alumina: particles of 2 to 50 μm, sodium and calcium aluminate: particles of 1 to 20 μm—specific weight 2.2, sodium silicoaluminate: particles of 1 to 20 μm—specific weight about 2.12, rutile titanium: particles of 0.5 to 10 μm—specific weight about 4.2, anatase titanium: particles of 0.5 to 10 μm—specific weight about 3.9, magnesium hydroxide: particles of 2 to 50 μm.

N.B. The specific weight is given in g/ml.

Organic fillers may be added in order to bring special additional properties.

The following description will illustrate by way of a first series of experiments, how the invention can be carried into practice.

EXAMPLE 1 (CONTROL)

According to Applicant's patent EP-6 390, a papermaking sheet is produced from an aqueous composition comprising the following basic mixture (the quantities are given by weight of dry materials):

| | |
|---|---|
| cellulose: mixture of two thirds of long fibers and one third of short fibers refined at 20 degrees Schoepper | 15.2 g |
| glassfibers: HW 618 sold by OWENS CORNING 11 um diameter; 3.2 mm long | 2.8 g |
| inorganic filler: talc No. 2 sold by TALC DE LUZERNAC | 71.1 g |
| cationic flocculating agent Nadavin ® LT sold by BAYER AG polyamide/polyamine - epichlorhydrin resin | 0.4 g |
| binding agent: Latex DOW 86 815 sold by DOW CHEMICAL carboxylated styrene-butadiene latex. | 10.4 g |

This mixture is diluted in the bowl of a paper test sample in the required concentration in order to obtain a paper test sample having a thickess approaching 1 mm. After such dilution, the retention agent is added in the bowl:

SEPARAN XD 8 494 sold by DOW CHEMICAL  0.1 g
cationic poly(acrylamide) of high molecular weight.

EXAMPLES 2 TO 5

Proceding as in Example 1, sheet products according to the invention have been prepared by incorporating, after the fibers, various quantities of recovery rubber powders sold by the company LAURENT PNEU.

The quality T0-008 is a sifted powder of granulometry less than 80 μm.

The quality T0-05 is a sifted powder of granulometry less than 500 μm.

The compositions and characteristics of examples 1 to 5 are given in Table I.

TABLE I

|  | Ex. 1 | Ex. 2 | Ex. 3 | Ex. 4 | Ex. 5 |
|---|---|---|---|---|---|
| Composition (% by dy weight) | | | | | |
| Parts of cellulose | 15.2 | 15.2 | 15.2 | 15.6 | 15.6 |
| Parts of glass fibers | 2.8 | 2.8 | 2.8 | 0 | 0 |
| Parts of rubber | — | 71.1 | 35.55 | 73.1 | 73.1 |
| reference | | T0008 | T0008 | T0008 | T005 |
| Parts of talc | 71.1 | — | 35.55 | — | — |
| Parts of binder | 10.4 | 10.4 | 10.4 | 10.7 | 10.7 |
| Flocculants and additives | 0.5 | 0.5 | 0.6 | 0.6 | |
| Characteristics | | | | | |
| G.M.S. (g/m$^2$) | 855 | 539 | 615 | 526 | 469 |
| Thickness (μ) | 1120 | 1018 | 936 | 978 | 1038 |
| Bulk (μ/g) (thickness/G.S.M) | 1.31 | 1.89 | 1.52 | 1.86 | 2.21 |
| Bendtsen Porosity in ml/min. | 332 | 2700 | 1538 | 2450 | >3000 |
| Scott Bond Internal Cohesion in Scott Bond* units | 219 | 336 | 243 | 390 | 317 |
| Water absorption$^{(1)}$ (per immersion) | | | | | |
| 10 hrs | 19.8% | 35.6% | 39.6% | 30.6% | 57.8% |
| 24 hrs | 54.8% | 70.4% | 80.3% | 58.9% | 81.8% |
| Water desorption$^{(2)}$ at 50% HR and 23° C. | | | | | |
| 1 hr | 33.9% | 31.4% | 30.4% | 43.6% | 35.5% |
| 6 hrs | 99% | 99.5% | 99% | 99.3% | 99.5% |
| On papers stoved for 2 hrs at 200° C. | | | | | |
| Pliability$^{(3)}$ | | | | | |
| mandrel 1.8 mm | 5 | 1 | 1 | 1 | 1 |
| mandrel 6.0 mm | 2 | 1 | 1 | 1 | 1 |
| Breaking elongation in | 3.9 | 6.1 | 5.1 | 8.8 | 10.3 |

TABLE I-continued

|  | Ex. 1 | Ex. 2 | Ex. 3 | Ex. 4 | Ex. 5 |
|---|---|---|---|---|---|
| % on band of 1.5 mm TABER Rigidity in TABER units | 325 | 70 | 140 | 53 | 32 |

$^{(1)}$% by weight of the initial meterial
$^{(2)}$% by weight of wasted water with respect to the initial water retained after 24 hours immersion in water.
$^{(3)}$Scole:
1: no crevices or cracks
2: considerable breaks
3: very considerable breaks
*measured on the Internal Bond Tester "model B" apparatus of Scott Testers INC.

From Table I, it is clear that the introduction according to the invention of an elastomer in powder form makes it possible to obtain a material having a high elasticity combined with high porosity, while retaining or even improving internal cohesion (compared with the prior art material).

The high elasticity of the material according to the invention is expressed by an increase of the breaking elongation, a great improvement of the reliability and great reduction of the rigidity.

The high porosity of the material is expressed by a high increase of the bulk and of the Bendtsen porosity as well as by its properties to absorb strong quantities of water and to desorb them rapidly.

Preservation if not improvement of the internal cohesion of the material is expressed by the stability if not the increase of the Scott Bond.

A second series of tests, examples 6 to 12, was conducted for materials of different thicknesses in order to assess the efficiency of the invention as a function of the thickness, anyone skilled in the art being quite aware that the flexibility is all the more difficult to obtain as the material is thick.

COMPARATIVE EXAMPLE 6

A paper test sample is produced according to example 1 above, the cellulose fibers having a refining degree of 25° Schoepper.

EXAMPLES 7 TO 12

Examples 7 to 12 illustrate the different tests conducted according to the invention, the thicknesses being between 1 and 3 mm with two qualities T0-05 and T0-02 of recovery rubber powder sold by the company LAURENT PNEU.

The quality T0-02 is a sifted powder of granulometry less than 200 um.

The compositions and characteristics of examples 6 to 12 are given in Table II.

TABLE II

|  | Ex. 6 | Ex. 7 | Ex. 8 | Ex. 9 | Ex. 10 | Ex. 11 | Ex. 12 |
|---|---|---|---|---|---|---|---|
| Composition (% by dy weight) | | | | | | | |
| Parts of cellulose | 15.2 | 15.2 | 15.2 | 15.2 | 15.2 | 15.6 | 15.6 |
| Parts of glass fibers | 2.8 | 2.8 | 2.8 | 2.8 | 2.8 | 0 | 0 |
| Parts of rubber | — | 71.1 | 71.1 | 35.55 | 35.55 | 73.1 | 73.1 |
| reference | | T0002 | T0005 | T0002 | T0002 | T0002 | T0002 |
| Parts of talc | 71.1 | — | — | 35.55 | 35.55 | — | — |
| Parts of binder | 10.4 | 10.4 | 10.4 | 10.4 | 10.4 | 10.7 | 10.7 |
| Flocculants and additives | 0.5 | 0.5 | 0.5 | 0.5 | 0.5 | 0.6 | 0.6 |
| Characteristics | | | | | | | |
| G.M.S. (g/m$^2$) | 852 | 504 | 438 | 598 | 1915 | 1647 | 565 |
| Thickness (μ) | 943 | 1024 | 1050 | 934 | 2707 | 2932 | 1240 |
| Bulk (μ/g) (thickness/G.S.M) | 1.11 | 2.03 | 2.40 | 1.56 | 1.41 | 1.77 | 2.19 |
| Bendtsen Porosity in ml/min. | 230 | >3000 | >3000 | 1495 | 580 | 1450 | 2542 |
| Scott Bond Internal Cohesion in Scott Bond* units | 235 | 382 | 245 | 235 | 386 | >500 | 398 |

TABLE II-continued

| | Ex. 6 | Ex. 7 | Ex. 8 | Ex. 9 | Ex. 10 | Ex. 11 | Ex. 12 |
|---|---|---|---|---|---|---|---|
| Water absorption[1] (per immersion) | | | | | | | |
| 10 hrs | 14.2% | 35.6% | 64.7% | 57.6% | 23.7% | 14.3% | 47.9% |
| 24 hrs | 48.9% | 70% | 137% | 84.8% | 52.9% | 40.4% | 80.8% |
| Water desorption[2] at 50% HR and 23° C. | | | | | | | |
| 1 hr | 18.1% | 26.7% | 26.9% | 24.0% | 16.6% | 25.9% | 24.9% |
| 6 hrs | 99.1% | 99.6% | 99.3% | 99.6% | 98.6% | 98.6% | 99.5% |
| On papers stoved for 2 hrs at 200° C. | | | | | | | |
| Pliability[3] | | | | | | | |
| mandrel 1.8 mm | 5 | 1 | 1 | 1 | 1 | 1 | 1 |
| mandrel 6.0 mm | 2 | 1 | 1 | 1 | 1 | 1 | 1 |
| Breaking elongation in % | 3.9 | 7.1 | 7.1 | 5.6 | 6.8 | 13.2 | 10.1 |
| Insulation Measurements | | | | | | | |
| Heat-Conductibility[4] in W/m. | 0.11 | 0.07 | | 0.06 | | | |
| Acoustic Absorption under 2000 Hz (%) | 1.5 | 4 | | 3.5 | | | |

[1] % by weight of the initial material
[2] % by weight of wasted water with respect to the initial water retained after 24 hours immersion in water.
[3] Scole:
1: no fissures or cracks
2: considerable breaks
3: very considerable breaks
[4] Method used: fluxmeter with double sensor between hot and cold plates
[5] KUNDT tube on BRUEL-KJRER heterodyne analyzer TYPE 2010
*measured on the Internal Bond Tester "model B" apparatus of Scott Testers INC.

The results obtained confirm that the introduction of an elastomer in powder form makes it possible to obtain a material having a high flexibility combined with a high porosity without any degradation of the internal cohesion and this regardless of the thickness of the material.

Moreover, measurements of the thermal conductivity and sound absorption have revealed properties of heat- and sound-insulating power in these materials.

The very special qualities of the materials according to the invention, namely the flexibility, the power of absorbing and desorbing very rapidly large quantities of liquid, both a heat- and sound-insulating power, as well as the low cost price of said materials makes them advantageously suitable for various applications, not only as base materials for vinyl floor and wall coverings, but also for other applications in the building industry as well as in leathergoods, such as in the luggage or shoes industry.

The use of the product according to the invention is not in any way restricted to the fields of application cited by way of example.

We claim:

1. A composition for manufacturing a flexible and porous product in sheet form by the wet method, said producing having a Bendtsen porosity greater than 1000 ml/min for a thickness of 1 mm which composition comprises:
    between 20% and 80% by dry weight of at least one elastomer powder, said powder having a granulometry of from 40 to about 500 μm;
    between 10% and 70% by dry weight of fibers of length which is less than 10 mm, said fibers being selected from the group consisting of mineral fiber, natural fiber and mixtures thereof;
    between 0% and 20% by dry weight of at least one binding agent;
    between 0.1% and 5% by dry weight of a flocculating agent and/or of at least one retention agent; and
    between 0% and 40% by dry weight of at least one filler which may be inorganic or organic;
    wherein the total of the above components is 100%.

2. A flexible and porous sheet product obtained by the wet method from the composition according to claim 1 having a porosity greater than 1000 ml/min for a thickness of 1 mm.

3. A flexible and porous sheet product obtained by the wet method from the composition according to claim 1.

4. A sheet product according to claim 2, characterized in that said fibers comprise a mixture of glass fibers and of cellulose fibers.

5. A sheet product according to claim 2, characterized in that said elastomer powder comprises vulcanized recovery rubber.

6. A sheet product according to claim 2, wherein the elastomer powder comprises a mixture of vulcanized rubber powder; the binding agents are of the latex type; and the flocculating agent is a cationic flocculating agent.

7. A sheet product according to claim 6, characterized in that it comprises:
    about 70 to 75% by dry weight of a mixture of vulcanized rubber powder;
    about 15 to 20% by dry weight of fibers;
    about 8 to 12% by weight of at least one latex type binding agent; and about 0.3 to 0.5% by weight of at least one cationic flocculating agent;
    wherein the total of the above components is 100%.

8. A process for the manufacture of a sheet product as defined according to claim 2, characterized in that it comprises the following steps:
    preparing an aqueous solution of a mixture containing:
        20 to 80% by weight of an elastomer in powder form, of mean granulometry from about 40 to about 500 μm; and
        10 to 70% by weight of fibers of length less than 10 mm; said fibers being selected from the group consisting of mineral fiber, natural fiber and mixtures thereof;
    adding to the suspension a first quantity of a flocculating agent;
    adding between 0 to 20% by weight of a binding agent to the suspension containing the flocculating agent; adding additives;
    then adding a second quantity of a flocculating agent and/or a retention agent; depositing the resulting aqueous suspension on a screen;

draining the suspension deposited on the screen in order to form a wet sheet; and drying the sheet in order to obtain the product in sheet form.

9. A sheet product according to claim 2 wherein the fiber is a mixture consisting of mineral fiber and cellulosic fiber.

10. A sheet product according to claim 2 wherein the elastomer powder is selected from the group consisting of vulcanized or non-vulcanized natural rubber and synthetic rubber.

11. A sheet product according to claim 9, wherein said cellulosic fibers are refined cellulosic fibers.

12. A composition according to claim 1 wherein the mixture is an intimate mixture.

13. A sheet product according to claim 2 wherein the mixture is an intimate mixture.

14. A composition according to claim 1 wherein the elastomer powder has granulometry between 40 and 300 μm.

15. A composition according to claim 1 wherein the elastomer powder represents more than 28.6% with respect of the fibers by dry weight.

16. A sheet product according to claim 2, having an internal cohesion of at least 219 Scott Bond units.

17. A sheet product according to claim 10 wherein the synthetic rubber is selected from the group consisting of BUNA (butadiene polymer), BUNA S or SBR (styrene-butadiene copolymer), acrylic butadiene-nitrile copolymers, polychloroprenes (2-chloro butadiene copolymers), chlorosulfonated polyethylenes, polyisobutylenes, ethylene-propylene, isobutylene-butadiene, isoprene copolymers, polyacrylic esters, fluorinated derivatives of rubber, silicon rubbers, and polyurethane elastomers.

18. A sheet product according to claim 10 wherein the synthetic rubber is selected from the group consisting of BUNA (butadiene polymer), BUNA S or SBR (styrene-butadiene copolymer), acrylic butadiene-nitrile bipolymers, polychloroprenes (2-chloro butadiene copolymers), chlorosulfonated polyethylenes, polyisobutylenes, ethylene-propylene, isobutylene-butadiene, isoprene copolymers, polyacrylic esters, fluorinated derivatives of rubber, silicon rubbers, and polyurethane elastomers.

* * * * *